US012272486B2

(12) United States Patent
Sasaki et al.

(10) Patent No.: US 12,272,486 B2
(45) Date of Patent: Apr. 8, 2025

(54) COMMON MODE CHOKE COIL

(71) Applicant: Murata Manufacturing Co., Ltd., Kyoto-fu (JP)

(72) Inventors: Tatsuya Sasaki, Nagaokakyo (JP); Shinya Hirai, Nagaokakyo (JP); Shin Hasegawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 147 days.

(21) Appl. No.: 18/050,298

(22) Filed: Oct. 27, 2022

(65) Prior Publication Data

US 2023/0075661 A1 Mar. 9, 2023

Related U.S. Application Data

(60) Division of application No. 16/143,114, filed on Sep. 26, 2018, now Pat. No. 11,508,515, which is a (Continued)

(30) Foreign Application Priority Data

Apr. 1, 2016 (JP) ................................ 2016-074223

(51) Int. Cl.
*H01F 27/28* (2006.01)
*H01F 17/06* (2006.01)
(Continued)

(52) U.S. Cl.
CPC ....... *H01F 27/2823* (2013.01); *H01F 17/062* (2013.01); *H01F 27/02* (2013.01);
(Continued)

(58) Field of Classification Search
CPC .... H01F 27/2823; H01F 17/062; H01F 27/02; H01F 27/24; H01F 27/2828; H01F 27/29;
(Continued)

(56) References Cited

U.S. PATENT DOCUMENTS 4,777,465 A * 10/1988 Meinel .................. H01L 23/642 336/200
4,975,671 A * 12/1990 Dirks .................. H01F 17/0033 336/200
(Continued)

FOREIGN PATENT DOCUMENTS

JP H02-235418 A 9/1990
JP H04-369206 A 12/1992
(Continued)

OTHER PUBLICATIONS

International Search Report issued in PCT/JP2017/009438; mailed Jun. 13, 2017.
(Continued)

*Primary Examiner* — Mang Tin Bik Lian
(74) *Attorney, Agent, or Firm* — Studebaker Brackett PLLC

(57) ABSTRACT

A common mode choke coil includes a core, and first and second coils opposed to each other and wound on the core. The core can have a square shape, or an elongated shape having a long axis and a short axis when viewed in a direction along a central axis of the core. Each of the first and second coils is a single-layer coil. An area of a cross-section of the core taken perpendicular to a circumferential direction of the core is constant in the circumferential direction of the core. The cross-section of the core has a quadrilateral shape.

6 Claims, 8 Drawing Sheets

Related U.S. Application Data continuation of application No. PCT/JP2017/009438, filed on Mar. 9, 2017.

(51) Int. Cl.
*H01F 27/02* (2006.01)
*H01F 27/24* (2006.01)
*H01F 27/29* (2006.01)
*H01F 17/00* (2006.01)

(52) U.S. Cl.
CPC ......... *H01F 27/24* (2013.01); *H01F 27/2828* (2013.01); *H01F 27/29* (2013.01); *H01F 27/292* (2013.01); *H01F 2017/0093* (2013.01)

(58) Field of Classification Search
CPC ........... H01F 27/292; H01F 2017/0093; H01F 27/28; H01F 27/306
See application file for complete search history.

(56) References Cited

U.S. PATENT DOCUMENTS

| | | | |
|---|---|---|---|
| 5,430,613 A | | 7/1995 | Hastings et al. |
| 5,543,773 A | | 8/1996 | Evans et al. |
| 8,497,756 B2 | | 7/2013 | Kiyono et al. |
| 9,754,714 B2 | | 9/2017 | Quilici |
| 2003/0070282 A1 | | 4/2003 | Hiatt et al. |
| 2007/0063807 A1 | | 3/2007 | Quilici |
| 2008/0100400 A1 | * | 5/2008 | Lucas .................. H05K 9/0066 333/185 |
| 2008/0186124 A1 | * | 8/2008 | Schaffer .............. H01F 27/2895 336/200 |
| 2009/0160596 A1 | * | 6/2009 | Yang ................... H01F 27/2895 336/208 |
| 2010/0007456 A1 | * | 1/2010 | Joehren ............... H01F 17/0033 336/200 |
| 2015/0061817 A1 | * | 3/2015 | Lee ..................... H01F 17/0013 336/221 |
| 2015/0371756 A1 | * | 12/2015 | Sturcken ................ H01F 27/24 336/200 |

FOREIGN PATENT DOCUMENTS

| | | |
|---|---|---|
| JP | H06-302437 A | 10/1994 |
| JP | 2003-347130 A | 12/2003 |
| JP | 2004-087854 A | 3/2004 |
| JP | 2006-165212 A | 6/2006 |
| JP | 2006-173201 A | 6/2006 |
| JP | 2007-088405 A | 4/2007 |

OTHER PUBLICATIONS

Written Opinion of the International Searching Authority issued in PCT/JP2017/009438; mailed Jun. 13, 2017.

* cited by examiner

COMMON MODE CHOKE COIL

CROSS-REFERENCE TO RELATED APPLICATIONS

This application is a Divisional of U.S. patent application Ser. No. 16/143,114, filed Sep. 26, 2018, which claims benefit of priority to International Patent Application No. PCT/JP2017/009438, filed Mar. 9, 2017, and to Japanese Patent Application No. 2016-074223, filed Apr. 1, 2016, the entire contents of each are incorporated herein by reference.

BACKGROUND

Technical Field

The present disclosure relates to a common mode choke coil.

Background Art

A coil component has been described in Japanese Unexamined Patent Application Publication No. 2006-165212. As illustrated in FIG. 8, a coil component 100 includes a toroidal core 101 and first and second coils 110 and 120, which are opposed to each other and wound on the core 101. The first coil 110 and the second coil 120 include inner wire members 111 and 121 positioned in the inner hole of the core 101, outer wire members 112 and 122 positioned on a radially outer side of the core 101, wiring lines 113 and 123 connecting the inner wire members 111 and 121 with the outer wire members 112 and 122, respectively.

SUMMARY

In the known coil component 100, the inner wire members 111 of the first coil 110 and the inner wire members 121 of the second coil 120 are arranged along an inner circumferential surface 101*a* of the core 101. In this configuration, the inner wire members 111 of the first coil 110 and the inner wire members 121 of the second coil 120 are close to each other in the circumferential direction. This forms a dead space D in the inner hole of the core 101 on the inner side of the first and second coils 110 and 120.

The width of the core 101 may be increased in the radial direction to increase the L value of the coil component 100. In such a case, the core 101 is expanded in the radial direction toward the inner side or toward the outer side.

However, when the core 101 is attempted to be radially expanded toward the outer side, the constraint by the external dimension of the coil component 100 prevents the core 101 from expanding in the radial direction toward the outer side.

When the core 101 is attempted to be radially expanded toward the inner side, the inner wire members 111 and 121 of the first and second coils 110 and 120 come in contact with each other in the circumferential direction, which prevents the core 101 from expanding in the radial direction toward the inner side. Specifically described, when the inner diameter of the core 101 is made gradually smaller, the inner wire members 111 of the first coil 110 and the inner wire members 121 of the second coil 120 come in contact with each other in the circumferential direction. Thus, the dead space D is not reduced.

In view of the above, the disclosure provides a common mode choke coil including a core having a radially large cross-sectional area and having a large L value.

A common mode choke coil according to the disclosure includes a core having a ring-like shape and a first coil and a second coil opposed to each other and wound on the core. The core has a square shape or an elongated shape having a long axis and a short axis when viewed in a direction along a central axis of the core. Each of the first coil and the second coil is a single-layer coil. An area of a cross-section of the core taken perpendicular to a circumferential direction of the core is constant in the circumferential direction of the core and the cross-section of the core has a quadrilateral shape.

The elongated shape includes an oblong shape, an elliptical shape, and an oval shape. The four corners of the square may be right-angled or curved. The four corners of the quadrilateral cross-section of the core may be right-angled or curved (R surface). Here, the single-layer coil means a coil having single layer winding on the core.

In the common mode choke coil according to the disclosure, the core has a square shape or an elongated shape, and the first coil and the second coil are opposed to each other and wound on the core. In this configuration, the first coil and the second coil are opposed to each other in a direction along a first side of the square and wound in a direction along a second side of the square, or the first coil and the second coil are opposed to each other in a short axis direction of the elongated shape and wound in a long axis direction of the elongated shape.

This allows portions of the first coil and the second coil located in the inner hole of the core to be arranged along the inner surface of the core in the direction along the second side of the square or the long axis of the elongated shape. Thus, the first coil and the second coil are located close to each other in the direction along the first side of the square or the short axis of the elongated shape. In other words, the inner hole of the core is able to be made smaller in the direction along the first side or the short axis such that the first coil and the second coil come in contact with each other in the direction along the first side or the short axis to reduce the dead space D in the inner hole of the core. This allows the core to expand toward the inner hole such that the dead space in the inner hole of the core is reduced. Thus, the cross-sectional area of the core is able to increase in the radial direction, leading to an increase in the L value.

In an embodiment of the common mode choke coil, the core has the square shape when viewed in the direction along the central axis of the core. Also, the first coil and the second coil are opposed to each other in a direction along a first side of the square, and wound on the core in a direction along a second side of the square.

In this embodiment, the shape of the core is square, and the first and second coils are opposed to each other in the direction along the first side of the square and are wound in the direction along the second side of the square. Thus, the first coil and the second coil in the inner hole of the core are arranged along the inner surface of the core in the direction along the second side of the square. This allows the first coil and the second coil to be close to each other in the direction along the first side of the square. Thus, the core is able to expand toward the inner hole such that the dead space in the inner hole of the core is reduced, increasing the cross-sectional area of the core in the radial direction. This increases the L value.

In an embodiment of the common mode choke coil, the core has the elongated shape when viewed in the direction along the central axis of the core. Also, the first coil and the second coil are opposed to each other in a short axis direction of the elongated shape, and wound on the core in a long axis direction of the elongated shape.

In this embodiment, the shape of the core is elongated, and the first and second coils are opposed to each other in the short axis direction of the elongated shape and are wound in the long axis direction of the elongated shape. Thus, the first coil and the second coil in the inner hole of the core are arranged along the inner surface of the core in the long axis direction of the elongated shape. This allows the first coil and the second coil to be close to each other in the short axis direction of the elongated shape. Thus, the core is able to expand toward the inner hole such that the dead space in the inner hole of the core is reduced, increasing the cross-sectional area of the core in the radial direction. This increases the L value.

In an embodiment of the common mode choke coil, the first coil and the second coil are located further inside than an outermost end of the core in the long axis direction of the core when viewed in the direction along the central axis of the core. In this embodiment, the size of the common mode choke coil is reduced in the long axis direction.

An embodiment of the common mode choke coil further includes a case housing the core. The case has a rectangular shape when viewed in a direction along the central axis of the core. The core has the square shape and is housed in the case with one side of the core extending in a direction along one side of the case, or the core has the elongated shape and is housed in the case with a long axis of the core extending in a direction along one side of the case.

In this embodiment, the case has a rectangular shape and the core is housed in the case with one side or the long axis of the core extending in the direction along one side of the case. With this configuration, the core is able to radially outwardly expand such that the dead space between the outer surface of the core and the inner surface of the case is reduced while a space for the first coil and the second coil is provided between the outer surface of the core and the inner surface of the case. Thus, the cross-sectional area of the core increases in the radial direction, leading to an increase in the L value.

In an embodiment of the common mode choke coil, the core has the elongated shape when viewed in the direction along the central axis of the core. Also, the case has an oblong shape when viewed in the direction along the central axis of the core, and the core is housed in the case with a long axis of the core extending in a long axis direction of the case.

In this embodiment, since the core is housed in the case with the long axis of the core extending in the long axis direction of the case. Also, the core is housed in the case with a higher filling factor of the core to the case.

One embodiment of the common mode choke coil further includes ferrite beads each having a tubular shape at corners of the case. The ferrite beads are connected to the first coil and the second coil. The first coil and the second coil each include a plurality of wire members connected to each other, the plurality of wire members includes bent wire members each having a substantially U shape and straight wire members each extending in a substantially straight line, the bent wire members and the straight wire members are alternately connected to be wound on the core, and the straight wire members are disposed in the ferrite beads.

In this embodiment, the bent wire members and the straight wire members that are alternately connected are wound on the core and the straight wire members are disposed in the ferrite beads. This configuration allows the bent wire members to be positioned only around the core, requiring only one kind of the bent wire members.

In one embodiment of the common mode choke coil, when $\Phi dw<2Rin$ and $(lz+2\Phi dw+2Cc-p)\geq 2Rin$, $$(\Phi dw+2Cc-p)>2Rin, \text{ where}$$

- $\Phi dw$ is a coil diameter [mm],
- $Cc-p$ is a clearance between an inner surface of the core and the coil [mm],
- $Lz$ is a minimum distance between the first coil and the second coil in an inner area of the core [mm], and
- $Rin$ is a radius of curvature of an inner corner of the core [mm].

In this embodiment, the magnetic path length of the core having an elongated shape is shorter than the magnetic path length of the elliptical core, thus further improving the L value.

In an embodiment of the common mode choke coil, when $\Phi dw\geq 2Rin$ and $(lz+2\Phi dw+2Cc-p)\geq 2Rin$, $$(4-\pi)\Phi dw+4Cp-p<(2\pi-4)Cc-p+2(4-\pi)Rin), \text{ where}$$

- $\Phi dw$ is a coil diameter [mm],
- $Cc-p$ is a clearance between an inner surface of the core and the coil [mm],
- $Cp-p$ is a coil clearance [mm],
- $Lz$ is a minimum distance between the first coil and the second coil in an inner area of the core [mm], and
- $Rin$ is a radius of curvature of an inner corner of the core [mm].

In this embodiment, the magnetic path length of the core having an elongated shape is shorter than the magnetic path length of the elliptical core, thus further improving the L value.

In an embodiment of the common mode choke coil, the first coil and the second coil do not intersect with the long axis of the core when viewed in the direction along the central axis of the core. In this the embodiment, an insulating space extending along the long axis of the core is provided between the first coil and the second coil.

In the common mode choke coil according to the disclosure, the core has a square shape or an elongated ring-like shape, and the opposed first and second coils each including a plurality of wire members are wound on the coil. This configuration allows the core to have a larger radial cross-sectional area, leading to an increase in the L value.

DESCRIPTION OF EMBODIMENTS

Hereinafter, the disclosure is described in detail by referring to illustrated embodiments.

First Embodiment

Figure 1:
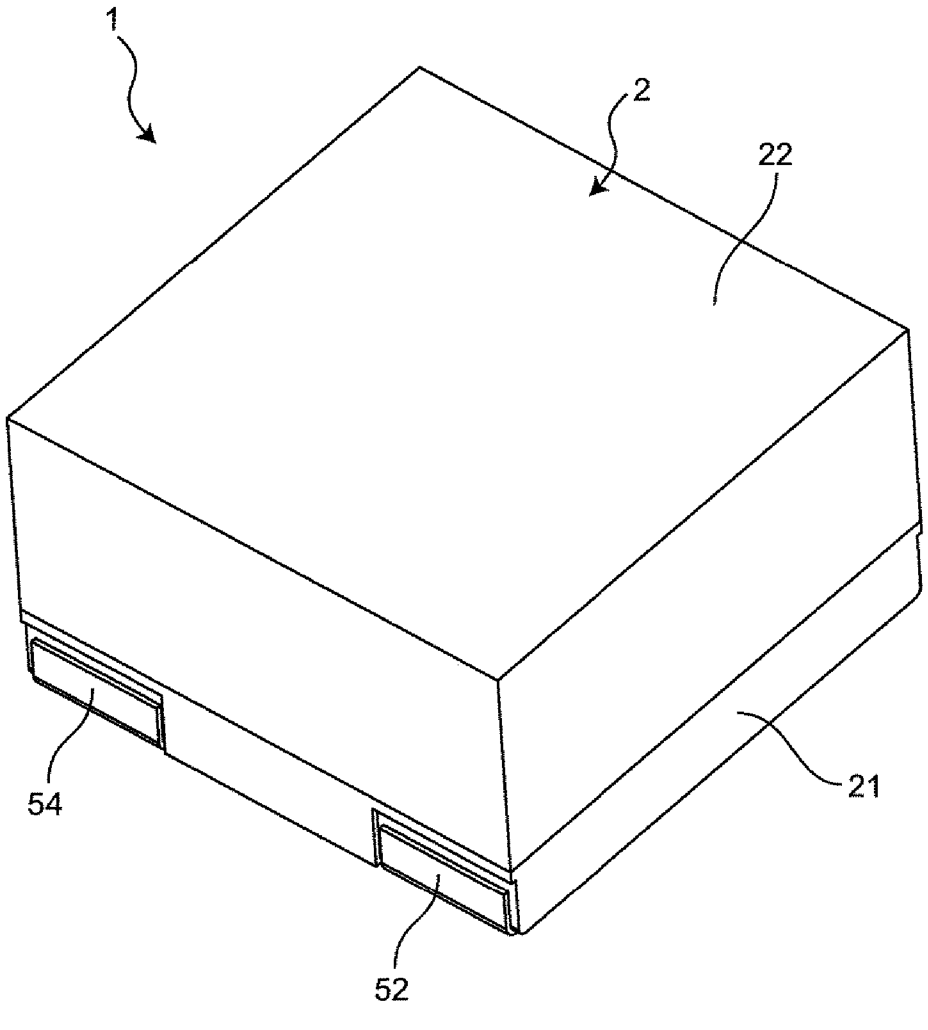
FIG. 1 is an upper perspective view of a common mode choke coil according to a first embodiment of the disclosure.
Figure 2:
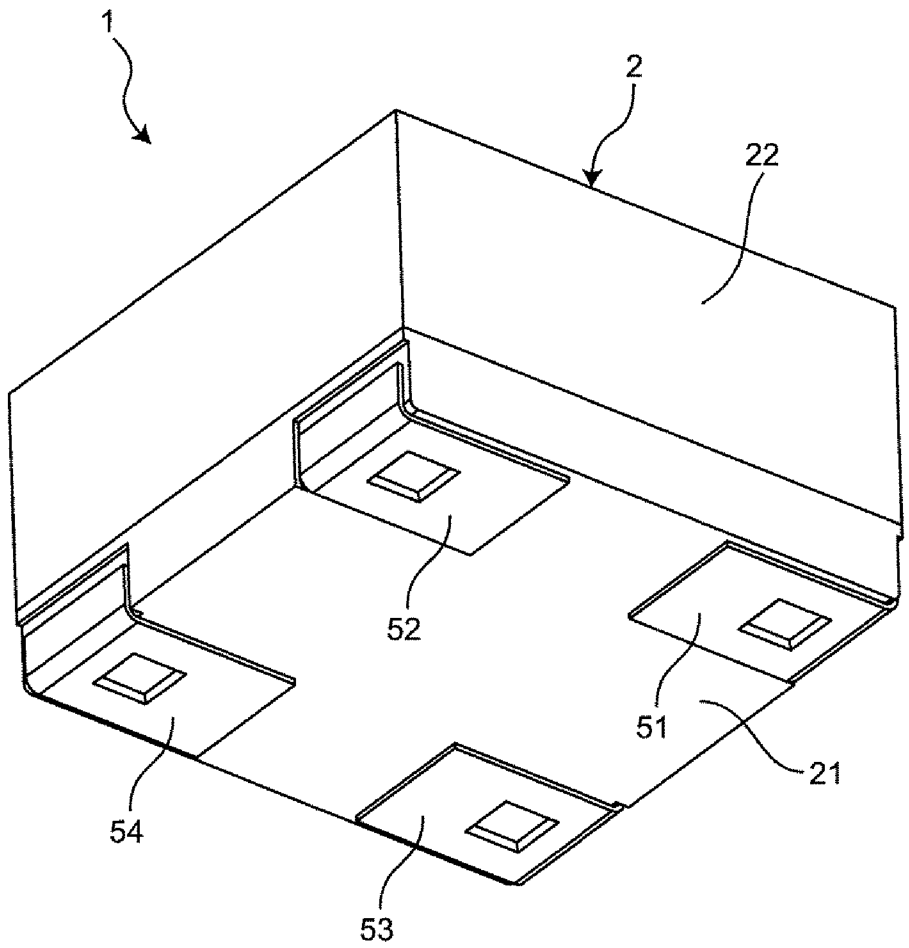
FIG. 2 is a lower perspective view of the common mode choke coil.
Figure 3:
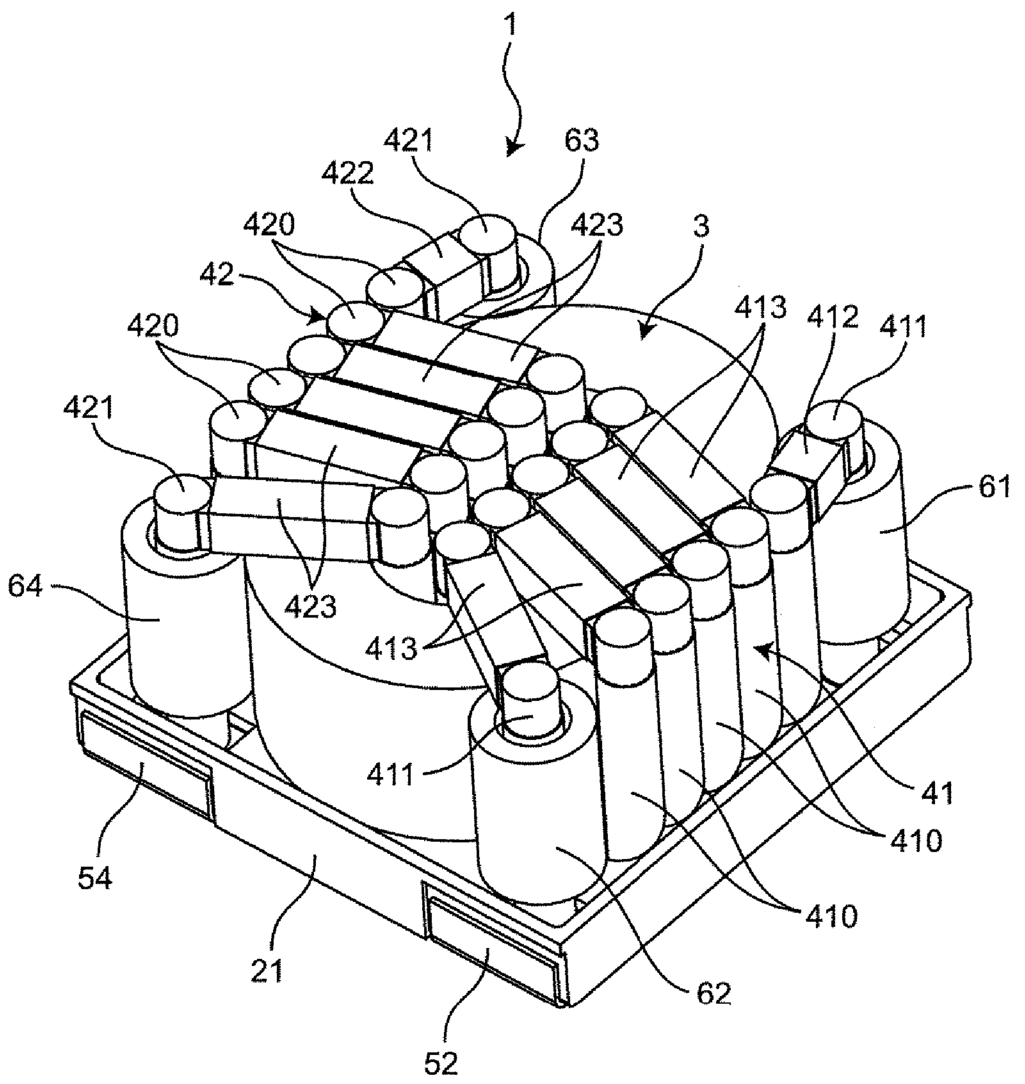
FIG. 3 is an upper perspective view illustrating an inside of the common mode choke coil.
Figure 4:
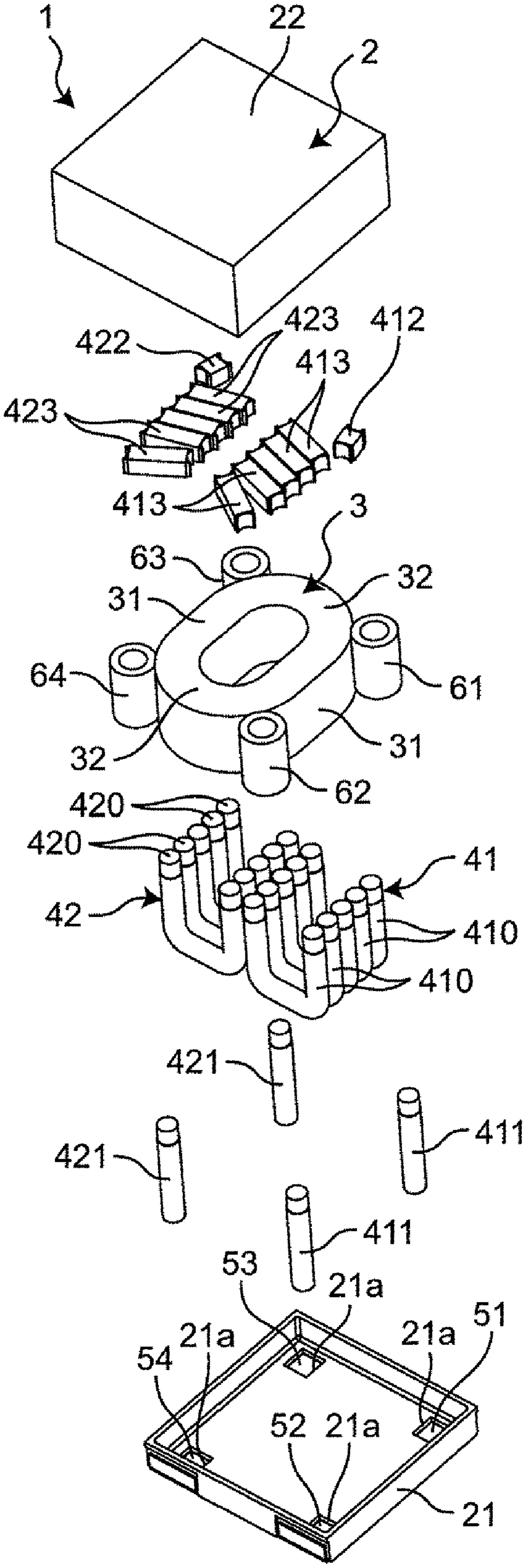
FIG. 4 is an exploded perspective view of the common mode choke coil.
Figure 5:
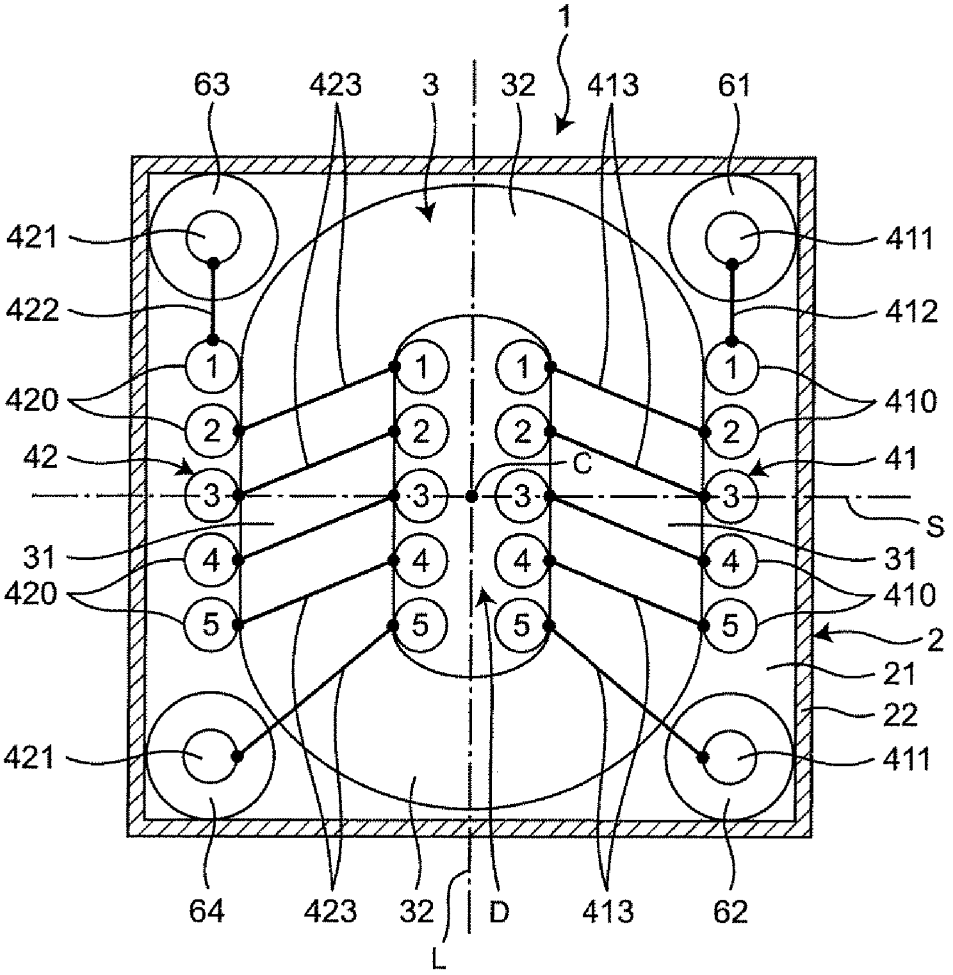
FIG. 5 is a plan view of the common mode choke coil.

FIG. 1 is an upper perspective view of a common mode choke coil according to a first embodiment of the disclosure. FIG. 2 is a lower perspective view of the common mode choke coil. FIG. 3 is an upper perspective view of the inside of the common mode choke coil. FIG. 4 is an exploded perspective view of the common mode choke coil. FIG. 5 is a plan view of the common mode choke coil.

As illustrated in FIG. 1 to FIG. 5, a common mode choke coil 1 includes a case 2, a core 3 having a ring-like shape and housed in the case 2, and first and second coils 41 and 42 opposed to each other and wound on the core 3. The choke coil 1 further includes first to fourth ferrite beads 61 to 64 connected to the first and second coils 41 and 42.

The case 2 includes a bottom plate 21 and a box-like cover 22 covering the bottom plate 21. The case 2 may be formed of plastic such as PPS or a ceramic material, for example. A core 3 is disposed on the bottom plate 21. The core 3 on the bottom plate 21 has the central axis C extending perpendicular to the bottom plate 21. The central axis C of the core 3 is the central axis of the inner hole of the core 3. The case 2 (the bottom plate 21 and the cover 22) has a rectangular shape when seen in a direction along the central axis C of the core 3. In this embodiment, the shape of the case 2 is square. The case 2 may have an oblong shape.

Electrode terminals 51 to 54 are disposed on the bottom plate 21. The first electrode terminal 51 and the second electrode terminal 52 are located at two opposite corners of the rectangular bottom plate 21. The third electrode terminal 53 and the fourth electrode terminal 54 are located at two opposite corners of the rectangular bottom plate 21. The first and third electrode terminals 51 and 53 are opposed to each other. The second and fourth electrode terminals 52 and 54 are opposed to each other.

The electrode terminals 51 to 54 are attached to the bottom surface of the bottom plate 21. The bottom plate 21 has holes 21*a* extending through the case 2 between the upper surface and the lower surface. The electrode terminals 51 to 54 overlap the holes 21*a* and are exposed to the inside of the case 2 through the holes 21*a*.

As shown, for example, in Fi. 5, the shape of the core 3 (i.e., the shape of the inner circumferential surface and the outer circumferential surface of the core 3) is an elongated shape having a long axis L and a short axis S when viewed in the direction along the central axis C. The long axis L is an axis of symmetry extending in a direction along a major diameter or a direction along the long side through the central axis C. The short axis S is an axis of symmetry extending in a direction along a minor diameter or a direction along the short side through the central axis C. The core 3 has two opposed long sections 31 extending along the long axis L and two opposed short sections 32 extending along the short axis S. In this embodiment, the core 3 has an elliptical shape. The core 3 may have an oblong shape or an oval shape, but not a precise circular shape. The four corners of the oblong shape each may be right-angled or curved. The core may have a square shape. The four corners of the square may be right-angled or curved. The cross-sectional area of the core taken perpendicular to the circumferential direction of the core 3 is constant in the circumferential direction of the core 3. The cross-section of the core 3 has a quadrilateral shape. The four corners of the quadrilateral cross-section of the core 3 may be right-angled or curved (R surface).

The core 3 may be a ceramic core formed of a ceramic material such as ferrite or a metal core. The core 3 has two surfaces on opposite sides in the direction along the central axis C. One of the surfaces faces the inner surface of the bottom plate 21. The other of the surfaces faces the inner surface of the cover 22. The core 3 is housed in the case 2 with the long axis L of the core 3 extending in a direction along one of the sides of the case 2 (the bottom plate 21).

The first coil 41, which is wound on the core 3, is located between the first electrode terminal 51 and the second electrode terminal 52. One end of the first coil 41 is connected to the first electrode terminal 51. The other end of the first coil 41 is connected to the second electrode terminal 52.

The second coil 42, which is wound on core 3, is located between the third electrode terminal 53 and the fourth electrode terminal 54. One end of the second coil 42 is connected to the third electrode terminal 53. The other end of the second coil 42 is connected to the fourth electrode terminal 54.

The first coil 41 and the second coil 42 are opposed to each other in the short axis S direction of the core 3 having an elongated shape and are each wound on the core 3 in the long axis L direction of the elongated shape. In other words, the first coil 41 is wound on one of the long sections 31 of the core 3 and the second coil 42 is wound on the other of the long sections 31 of the core 3. The winding directions of the first coil 41 and the second coil 42 on the core 3 are opposite. The number of turns of the first coil 41 and the number of turns of the second coil 42 are the same. The first and second coils 41 and 42 are single-layer coils. The first and second coils 41 and 42 do not intersect with the long axis L of the core 3 when viewed in the direction along the central axis C of the core 3. This configuration provides an insulating space extending along the long axis L of the core 3 between the first coil 41 and the second coil 42. The first and second coils 41 and 42 are located further inside than the outermost end of the core 3 in the long axis L direction of the core 3 when viewed in the direction along the central axis C of the core 3. This configuration reduces the size of the common mode choke coil 1 in the long axis L direction.

The first to fourth ferrite beads 61 to 64 are formed of a magnetic material, such as NiZn and MnZn. The ferrite beads 61 to 64 have a tubular shape and reside on the respective four corners of the case 2. The axes of the ferrite beads 61 to 64 are parallel to the central axis C of the core 3. The ferrite beads 61 to 64 are located radially outwardly from the core 3.

The first ferrite bead 61 is located at a first end of the first coil 41 (adjacent to the first electrode terminal 51). The second ferrite bead 62 is located at a second end of the first coil 41 (adjacent to the second electrode terminal 52). The third ferrite bead 63 is located at a first end of the second coil 42 (adjacent to the third electrode terminal 53). The fourth ferrite bead 64 is located at a second end of the second coil 42 (adjacent to the fourth electrode terminal 54).

The first coil 41 is composed of wire members connected to each other. The wire members are not printed wires, but rod-like members. The wire members may be rigid or flexible. The wire members have bent wire members 410 each bent in a substantially U-shape and straight wire members 411, 412, and 413 extending in a substantially straight line. The first coil 41 includes, in this order from the first end to the second end, the first straight wire member 411, the second straight wire member 412, pairs (five pairs in this embodiment) of the bent wire member 410 and the third straight wire member 413, and the first straight wire member 411. The first, second, and third straight wire members 411, 412, and 413 have different lengths.

The wire members 410 to 413 each may be a polyamide imide copper wire including a copper wire and an insulating film covering the copper wire. The thickness of the insulating film may be 0.029 mm to 0.072 mm. The insulating film is coated with an insulating material such as polyolefin resin.

The bent wire members 410 and the third straight wire members 413 are alternately connected. A first end of the third straight wire member 413 is connected to a first end of one of the bent wire members 410. A second end of the third straight wire member 413 is connected to a first end of another one of the bent wire members 410. This is repeated such that the bent wire members 410 and the third straight wire members 413 are wound on the core 3 in a helical manner. In other words, one pair of the bent wire member 410 and the third straight wire member 413 constitutes one unit providing one turn. In FIG. 5, the numbers indicated in the bent wire members 410 are the number of turn. The first coil 41 have five turns wound on the core 3.

The first straight wire members 411 are disposed in the first and second ferrite beads 61 and 62. The first straight wire member 411 in the first ferrite bead 61 is connected to the first electrode terminal 51. The first straight wire member 411 in the second ferrite bead 62 is connected to the second electrode terminal 52.

The second coil 42 is composed of wire members as the first coil 41. Specifically described, the second coil 42 includes, in this order from one side to the other end, a first straight wire member 421, a second straight wire member 422, pairs (five pairs in this embodiment) of a bent wire member 420 and a third straight wire member 423, and another first straight wire member 421. The bent wire members 420 and the third straight wire members 423 are alternately connected to be wounded on the core 3. The second coil 42 wound on the core 3 has five turns. The first straight wire members 421 are disposed in the third and fourth ferrite beads 63 and 64.

In the common mode choke coil 1 having the above-described configuration, the core 3 has an elongated shape. The first and second coils 41 and 42 each composed of the wire members are opposed to each other and wound on the core 3. The first and second coils 41 and 42 opposed to each other in the short axis S direction of the elongated shape are wound in the long axis L direction of the elongated shape.

This allows the wire members of the first coil 41 located in the inner hole of the core 3 (portions of the bent wire member 410) and the wire members of the second coil 42 (portions of the bent wire member 420) to be arranged along the inner surface of the core 3 in the long axis L direction of the elongated shape. Thus, the wire members of the first coil 41 and the wire members of the second coil 42 are located close to each other in the short axis S direction of the elongated shape. In other words, the inner hole of the core 3 is able to be made smaller in the short axis S direction such that the wire members of the first coil 41 and the wire members of the second coil 42 come in contact with each other in the short axis S direction to reduce the dead space D in the inner hole of the core 3. Thus, the core 3 is able to expand toward the inner hole such that the dead space D in the inner hole of the core 3 is reduced. This increases the cross-sectional area of the core 3 in the radial direction (i.e., the cross-sectional area in a direction perpendicular to the central axis C of the core 3), leading to an increase in the L value.

The L value is explained. The inductance L is expressed by the following (equation 1).

$$L=(\mu_0 \mu T^2 Se)/Le \quad \text{(equation 1)}$$

where

L is inductance [H], $\mu_0$ is air magnetic permeability [H/m], $\mu$ is relative magnetic permeability (core) [−], T is the number of turns of each coil [−], Se is a cross-sectional area of the core (an area of the cross-section taken perpendicular to the central axis of the core) [$m^2$], and Le is a magnetic path length [m].

The core having an elongated shape is able to have a reduced inner surrounded area, allowing the cross-sectional area of the core to be larger by the reduced area. This improves the L value. In some cases, the core having an elongated shape has a longer magnetic path length Le than a circular core, which may be disadvantageous in improvement in the L value. However, the core having an elongated shape is advantageous in increasing the core cross-sectional area Se, which surpasses the disadvantage. Thus, the L value is improved.

If the magnetic path length of the core having an elongated shape is shorter than that of a circular core, the L value is further improved. The conditions for this are explained.

Figure 6A:
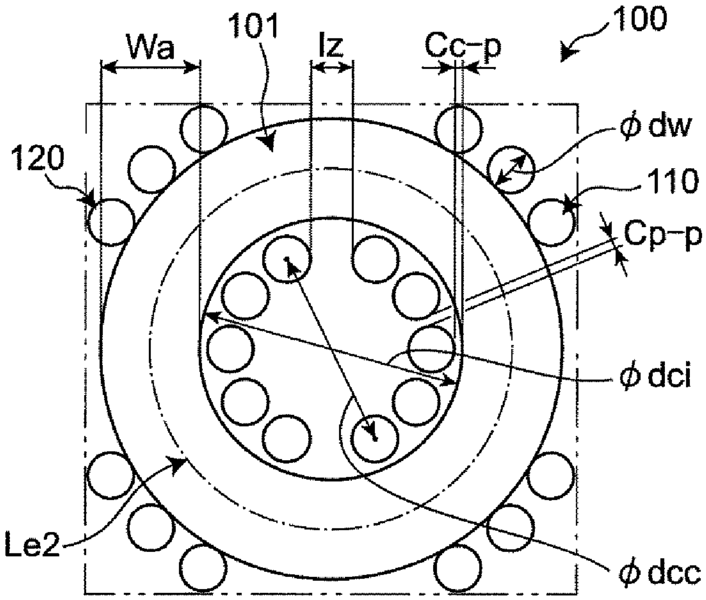
FIG. 6A is a plan view of a common mode choke coil including a circular core.

FIG. 6A illustrates a common mode choke coil including a circular core. As illustrated in FIG. 6A, a common mode choke coil 100 includes a circular core 101, a first coil 110, and a second coil 120, which are wound on the circular core 101. The dimensions are defined as indicated in FIG. 6A. The dimensions of the core and the magnetic path length of the core are expressed by following general formulas:

$$\Phi dcc=2/\pi(lz+T\Phi dw+Cp\text{-}p(T-1));$$

$$\Phi dci=\Phi dcc+\Phi dw+2Cc\text{-}p; \text{ and}$$

$$Le2=\pi(\Phi dci+Wa)$$

where

Le2 is a magnetic path length of a core (a length of the core in the circumferential direction at the radial center of the width of the core) [mm], Φdw is a coil diameter [mm], Cc−p is a clearance between the inner surface of the core and the coil (a distance between the inner surface of the core and the wire member) [mm], Cp−p is a coil clearance (a distance between adjacent two of the wire members in an inner area of the core) [mm], Lz is the minimum distance between the first coil and the second coil in the inner area of the core [mm], Wa is a width of the core in a radial direction [mm], T is the number of turns of each coil [−], Φdci is an inner diameter of the core [mm], and Φdcc is a diameter between the centers of coils in the inner area of the core [mm].

Figure 6B:
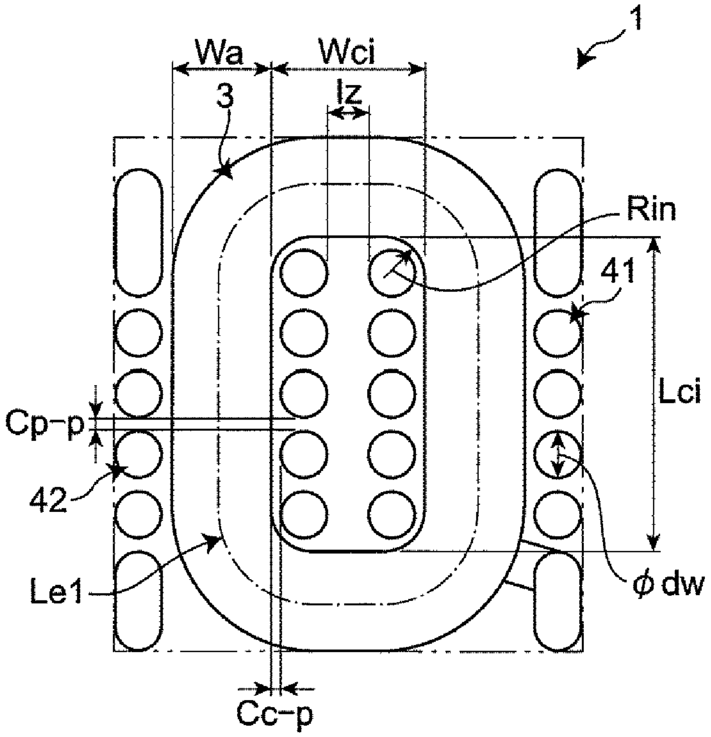
FIG. 6B is a plan view of a common mode choke coil including a core having an elongated shape.

FIG. 6B illustrates a common mode choke coil including a core having an elongated shape or an elongated core. As illustrated in FIG. 6B, a common mode choke coil 1 includes an elongated core 3, a first coil 41, and a second coil 42, which are wound on the elongated core 3. The dimensions are defined as indicated in FIG. 6B. The magnetic path length of the core is expressed by a general formula $$Le1=2Lci+2Wci+\pi Wa+2(\pi-4)Rin.$$

$$\text{If } \Phi dw<2Rin,\ Lci=(T-1)\Phi dw+Cp\text{-}p)+2Rin,$$

$$\text{if } \Phi dw\geq 2Rin,\ Lci=T\Phi dw+(T+1)Cp\text{-}p,$$

$$\text{if } (lz+2\Phi dw+2Cc\text{-}p)<2Rin,\ Wci=2Rin, \text{ and}$$

$$\text{if } (lz+2\Phi dw+2Cc\text{-}p)\geq 2Rin,\ Wci=lz+2\Phi dw+Cc\text{-}p)$$

where

Le1 is a magnetic path length of a core (a length of the core in the circumferential direction at the radial center of the width of the core) [mm], Φdw is a coil diameter [mm], Cc−p is a clearance between the inner surface of the core and the coil (a distance between the inner surface of the core and the surface of the coil member) [mm], Cp−p is a coil clearance (a distance between the surfaces of adjacent two of the wire members in the inner area of the core) [mm], Lz is the minimum distance between the surface of the first coil and the surface of the second coil in the inner area of the core[mm], Wa is a width of the core in the radial direction [mm], T is the number of turns of each coil [−], Rin is a radius of curvature of four inner corners of the core [mm], Lci is an inner diameter of the inner area of the core in a long axis direction [mm], and Wci is an inner diameter of the inner area of the core in a short axis direction [mm].

The circular core (FIG. 6A) and the elongated core (6B) have the same values for Φdw, Cc−p, Cp−p, lz, Wa, and T.

The L value is further improved when the magnetic path length Le1 of the elongated core is shorter than the magnetic path length Le2 of the circular core. In other words, when $\Delta Le = Le2 - Le1$ is calculated to be $\Delta Le > 0$, the L value is further improved.

More specifically described, when $\Phi dw < 2Rin$ and $(lz + 2\Phi dw + 2Cc-p) \geq 2Rin$, $$\Phi dw + 2Cc-p) > 2Rin \quad \text{Expression (1).}$$

When $\Phi dw \geq 2Rin$ and $(lz + 2\Phi dw + 2Cc-p) \geq 2Rin$, $$(4-\pi)\Phi dw + 4Cp-p < (2\pi-4)Cc-p + 2(4-\pi)Rin) \quad \text{Expression (2).}$$

As described above, the magnetic path length of the elongated core is shorter than that of the circular core when at least one of the two relation Expressions (1) and (2) is satisfied. Thus, the L value is further improved.

In the common mode choke coil 1 having the above-described configuration, if the core 3 has a square shape, the first and second coils 41 and 42 are opposed to each other in a direction along a first side of the square and are wound in a direction along a second side of the square. Thus, the wire members of the first coil 41 and the wire members of the second coil 42 in the inner hole of the core 3 are arranged along the inner surface of the core 3 in the direction along the second side of the square. This allows the wire members of the first coil 41 and the wire members of the second coil 42 to be close to each other in the direction along the first side of the square. Thus, the core 3 is able to expand toward the inner hole such that the dead space D in the inner hole of the core 3 is reduced, increasing the cross-sectional area of the core 3 in the radial direction. This increase the L value.

In the common mode choke coil 1 having the above-described configuration, the case 2 has a rectangular shape and the core 3 has an elongated shape. The core 3 is housed in the case 2 with the long axis extending in the direction along one side of the case 2. With this configuration, the core 3 is able to radially outwardly expand such that the dead space D between the outer surface of the core 3 and the inner surface of the case 2 is reduced while a space for the wire members of the first coil 41 and the second coil 42 is provided between the outer surface of the core 3 and the inner surface of the case 2. Thus, the cross-sectional area of the core 3 is increased in the radial direction, leading to an increase in the L value. The core 3 having a square shape is able to have the same advantage when the core 3 is housed in the case 2 with one side of the core 3 extending in the direction along one side of the case 2.

In the common mode choke coil 1 having the above-described configuration, the bent wire members 410 and 420 and the third straight wire members 413 and 423 that are alternately connected are wound on the core 3 and the straight wire member 411 is disposed in each of the ferrite beads 61 to 64. This configuration allows the bent wire members 410 and 420 to be positioned only around the core 3, requiring only one kind of the bent wire members 410 and 420. In contrast, if the bent wire members are wound on both of the core and the ferrite beads, more kinds of the bent wire members are required.

Second Embodiment

Figure 7:
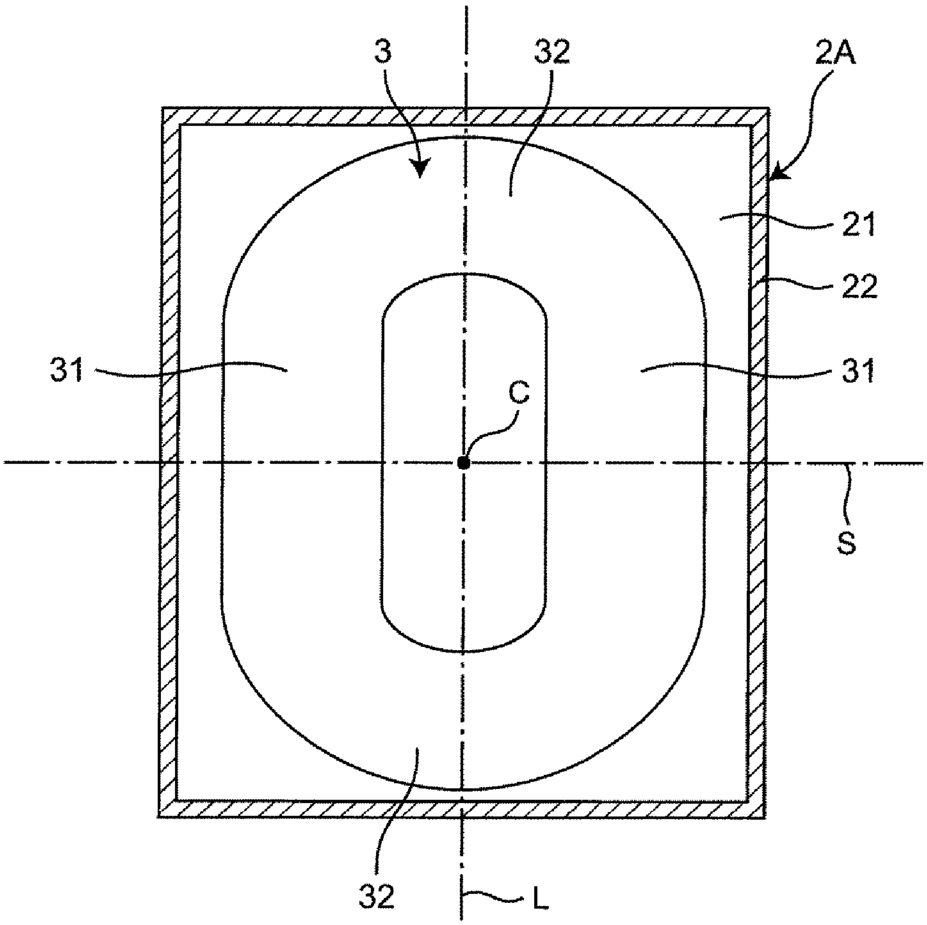
FIG. 7 is a plan view of a common mode choke coil according to a second embodiment of the disclosure.
Figure 8:
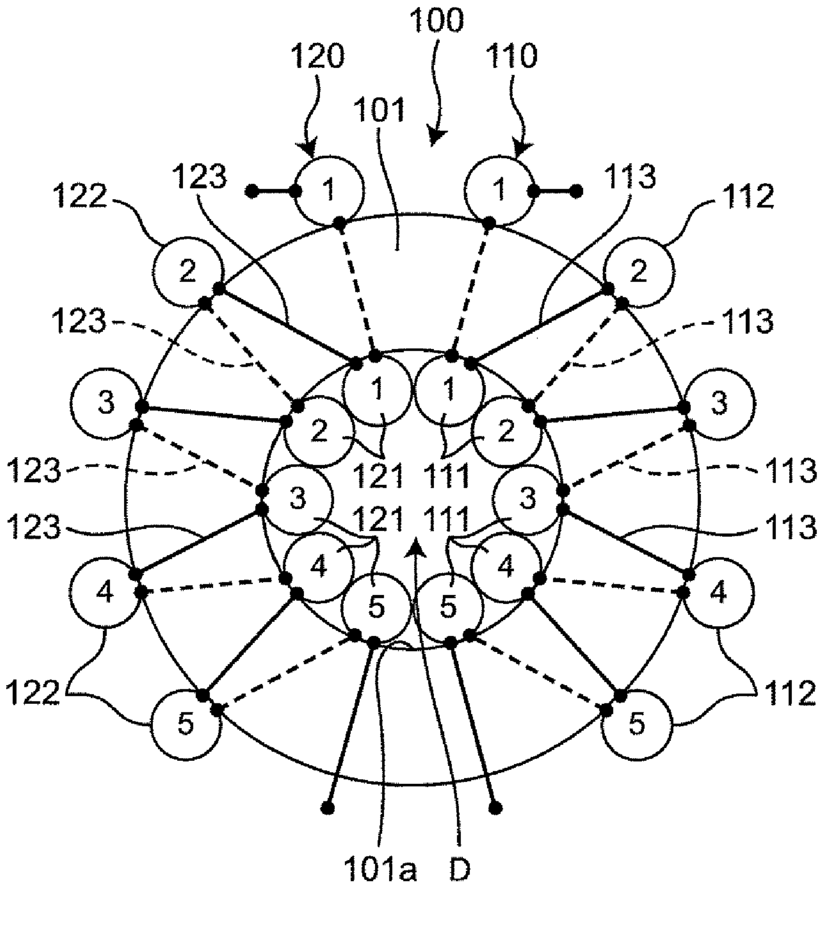
FIG. 8 is a plan view of a known coil component.

FIG. 7 is a plan view illustrating a common mode choke coil according to a second embodiment of the disclosure. The second embodiment differs from the first embodiment in the shape of the case. This difference is explained below. In the second embodiment, the same reference numeral is assigned to the same component as that in the first embodiment without duplicated explanation.

As illustrated in FIG. 7, a case 2A has an oblong shape when viewed in the direction along the central axis C of the core 3. The core 3 has an elongated shape (an elliptical shape in this embodiment) when viewed in the direction along the central axis C of the core 3. The core 3 is housed in the case 2A with the long axis L extending in the long axis direction of the case 2A. In FIG. 7, the coils and the ferrite beads are not illustrated.

Since the core 3 is housed in the case 2A with the long axis L of the core 3 extending in the long axis direction of the case 2A, the core 3 is able to be housed in the case 2A with a higher filling factor of the core 3 to the case 2A.

EXAMPLE

Next, Table 1 indicates a comparison between an example including a common mode choke coil having an elliptical core and a comparative example including a known common mode choke coil having a circular core.

TABLE 1

| | Elliptical Core | Circular Core |
|---|---|---|
| L value [μH] | 194 | 183 |
| Rdc [mΩ] | 1.49 | 1.49 |
| Core Magnetic Path Length [mm] | 40.6 | 39.1 |
| Core Cross-sectional Area [$mm^2$] | 25.1 | 22.8 |

In the elliptical core and the circular core, the diameter of the coil is 1.8 mm and the number of turns of the coil is five. The outer dimension of the case is 20 mm×20 mm×11.5 mm. The inner dimension is 19 mm×19 mm×10.5 mm. The material of the core is MnZn (μ'=10000). The ferrite beads are placed on the respective four corners. The R dimension of the four inner corners of the elliptical core is 3 mm.

Each of the first and second coils is a single-layer coil. The cross-sectional area of the core taken perpendicular to the circumferential direction of the core is constant in the circumferential direction of the core. The cross-sectional shape of the core is quadrilateral. The first coil and the second coil are separate from each other by an insulating distance. The height of the core in the direction along the central axis is constant in the circumferential direction of the core. There is a space between adjacent wire members. The diameter of the coil (the wire member) is constant. The L value is calculated by the (equation 1) above.

As can be seen from Table 1, the L value is higher in the elliptical core than in the circular core. The L value of the elliptical core is higher than that of the circular core by 6.1%. This results from that the cross-sectional area of the elliptical core is larger than that of the circular core by 14%, although the magnetic path length of the elliptical core is longer than that of the circular core by 9%. The L value is increased, because the L value improvement effect due to the increase in the cross-sectional area surpasses the L value reduction effect due to the increase in the magnetic path length.

The present disclosure is not limited to the above-described embodiments and may be modified without departing from the scope of the disclosure. For example, features of the first and second embodiments may be used in various combinations.

In the above-described embodiments, the number of ferrite beads is four but may be three or less or five or more. The ferrite beads are located radially outwardly from the core but may be located radially inwardly from the core. The case has a rectangular shape but may have a circular shape, for example.

The ferrite beads may be eliminated in a configuration including a core having an elongated shape and a rectangular case, in which wire members are opposed in the short axis direction of the elongated shape. In such a case, the cross-sectional area of the short sections of the core is able to be made large to increase the cross-sectional area of the magnetic material.

What is claimed is:

1. A common mode choke coil comprising:

a core having a square shape when viewed in a direction along a central axis of the core; and a first coil and a second coil opposed to each other in a direction along a first side of the square and wound on the core in a direction along a second side of the square, wherein each of the first coil and the second coil is a single-layer coil, and an area of a cross-section of the core taken perpendicular to a circumferential direction of the core is constant in the circumferential direction of the core, and the cross-section of the core has a quadrilateral shape, and wherein $$\text{when } \Phi dw < 2Rin \text{ and } (lz + 2\Phi dw + 2Cc{-}p) \geq 2Rin,$$

$$(\Phi dw + 2Cc{-}p) \geq 2Rin, \text{ where}$$

Φdw is a coil diameter,

Cc−p is a clearance between an inner surface of the core and the coil, lz is a minimum distance between the first coil and the second coil in an inner area of the core, and Rin is a radius of curvature of an inner corner of the core.

2. The common mode choke coil according to claim 1, further comprising:

a case housing the core, the case having a rectangular shape when viewed in the direction along the central axis of the core, wherein the core has the square shape and is housed in the case with one side of the core extending in a direction along one side of the case.

3. The common mode choke coil according to claim 2, further comprising:

ferrite beads each having a tubular shape at corners of the case, the ferrite beads being connected to the first coil and the second coil, wherein the first coil and the second coil each include a plurality of wire members connected to each other, the plurality of wire members includes bent wire members each having a substantially U shape and straight wire members each extending in a substantially straight line, the bent wire members and the straight wire members are alternately connected to be wound on the core, and the straight wire members are disposed in the ferrite beads.

4. A common mode choke coil comprising:

a core having a square shape when viewed in a direction along a central axis of the core; and a first coil and a second coil opposed to each other in a direction along a first side of the square and wound on the core in a direction along a second side of the square, wherein each of the first coil and the second coil is a single-layer coil, and an area of a cross-section of the core taken perpendicular to a circumferential direction of the core is constant in the circumferential direction of the core, and the cross-section of the core has a quadrilateral shape, and wherein $$\text{when } \Phi dw \geq 2Rin \text{ and } (lz + 2\Phi dw + 2Cc{-}p) \geq 2Rin,$$

$$(4-\pi)\Phi dw + 4Cp{-}p < (2\pi-4)Cc{-}p + 2(4-\pi)\, Rin, \text{ where}$$

dw is a coil diameter,

Cc−p is a clearance between an inner surface of the core and the coil,

Cp−p is a coil clearance, lz is a minimum distance between the first coil and the second coil in an inner area of the core, and Rin is a radius of curvature of an inner corner of the core.

5. The common mode choke coil according to claim 4, further comprising:

a case housing the core, the case having a rectangular shape when viewed in the direction along the central axis of the core, wherein the core has the square shape and is housed in the case with one side of the core extending in a direction along one side of the case.

6. The common mode choke coil according to claim 5, further comprising:

ferrite beads each having a tubular shape at corners of the case, the ferrite beads being connected to the first coil and the second coil, wherein the first coil and the second coil each include a plurality of wire members connected to each other, the plurality of wire members includes bent wire members each having a substantially U shape and straight wire members each extending in a substantially straight line, the bent wire members and the straight wire members are alternately connected to be wound on the core, and the straight wire members are disposed in the ferrite beads.

* * * * *